US009248523B2

(12) United States Patent
Paganelli

(10) Patent No.: US 9,248,523 B2
(45) Date of Patent: Feb. 2, 2016

(54) LASER MACHINE, LASER MACHINE SYSTEM

(71) Applicant: Agie Charmilles New Technologies SA, Meyrin 1 (CH)

(72) Inventor: Dino Cataldo Paganelli, Saint Alban de Montbel (FR)

(73) Assignee: AGIE CHARMILLES NEW TECHNOLOGIES SA, Meyrin (CH)

( * ) Notice: Subject to any disclaimer, the term of this patent is extended or adjusted under 35 U.S.C. 154(b) by 405 days.

(21) Appl. No.: 13/917,690

(22) Filed: Jun. 14, 2013

(65) Prior Publication Data

US 2013/0334183 A1    Dec. 19, 2013

(30) Foreign Application Priority Data

Jun. 15, 2012    (EP) ..................... 12172106

(51) Int. Cl.
*B23K 37/00* (2006.01)
*B23K 37/02* (2006.01)
*B23K 26/00* (2014.01)
(Continued)

(52) U.S. Cl.
CPC ............. *B23K 26/0648* (2013.01); *B23K 26/00* (2013.01); *B23K 26/0066* (2013.01); *B23K 26/043* (2013.01); *B23K 26/0639* (2013.01); *B23K 26/1482* (2013.01); *B23K 26/20* (2013.01); *B23K 26/36* (2013.01); *B23K 26/38* (2013.01); *B23K 26/381* (2013.01); *B23K 37/00* (2013.01); *B23K 37/02* (2013.01); *B23Q 3/155* (2013.01); *G02B 7/14* (2013.01)

(58) Field of Classification Search
CPC .... B23K 23/0648; B23K 26/00; B23K 37/00; B23K 37/12; B23Q 3/155

USPC ................ 219/121.6, 121.63–121.72; 29/50; 483/13, 16, 19
See application file for complete search history.

(56) References Cited

U.S. PATENT DOCUMENTS 4,103,414 A * 8/1978 Herb ...................... B21D 28/12
                                                           483/28
4,698,480 A * 10/1987 Klingel .................. B21D 28/12
                                                         219/121.39
(Continued)

FOREIGN PATENT DOCUMENTS

DE    102010020653 A1    11/2011
JP       61137382 A       6/1986
(Continued)

OTHER PUBLICATIONS

European Search Report for EP12172106.2 dated Nov. 30, 2012.

*Primary Examiner* — Samuel M Heinrich
(74) *Attorney, Agent, or Firm* — Bachman & LaPointe, P.C.

(57) ABSTRACT

A laser machine (1), in particular for drilling, cutting, welding or engraving, comprising at least one laser light source (3,4,5) for generating a laser beam (9) and an optical system (6) to guide and/or manipulate the laser beam (9), whereby the optical system (6) comprises at least one tool (23), in particular an optical lens (24) or a nozzle, which is attached to an interchangeable tool holder (12). It is provided that a guiding system (16) for the tool holder (12) is configured such that the tool holder (12) can only be slid sideways into or out of a tool bay (10) provided by the laser machine (1), the guiding system (16) comprising an operable locking system (37) for restraining the movement of the tool holder (12) in the tool bay (10).

16 Claims, 5 Drawing Sheets

(51) Int. Cl.
*B23Q 3/155* (2006.01)
*B23K 26/06* (2014.01)
*B23K 26/04* (2014.01)
*B23K 26/14* (2014.01)
*B23K 26/20* (2014.01)
*B23K 26/36* (2014.01)
*B23K 26/38* (2014.01)
*G02B 7/14* (2006.01)

(56) References Cited

U.S. PATENT DOCUMENTS 5,160,824 A * 11/1992 Babel ................ B23K 26/0093
    219/121.68

6,359,256 B1 * 3/2002 Biermann .......... B23K 26/1482
    219/121.75
8,360,944 B2 * 1/2013 Erlenmaier ........ B26K 26/1482
    219/121.67
2004/0167001 A1 * 8/2004 Hagihara ................ B23K 9/32
    483/7
2005/0061790 A1 3/2005 Lambert et al.

FOREIGN PATENT DOCUMENTS

| | | |
|---|---|---|
| JP | 6206969 A | 3/1987 |
| JP | 2003215419 A | 7/2003 |
| KR | 20110001604 A | 1/2011 |

* cited by examiner

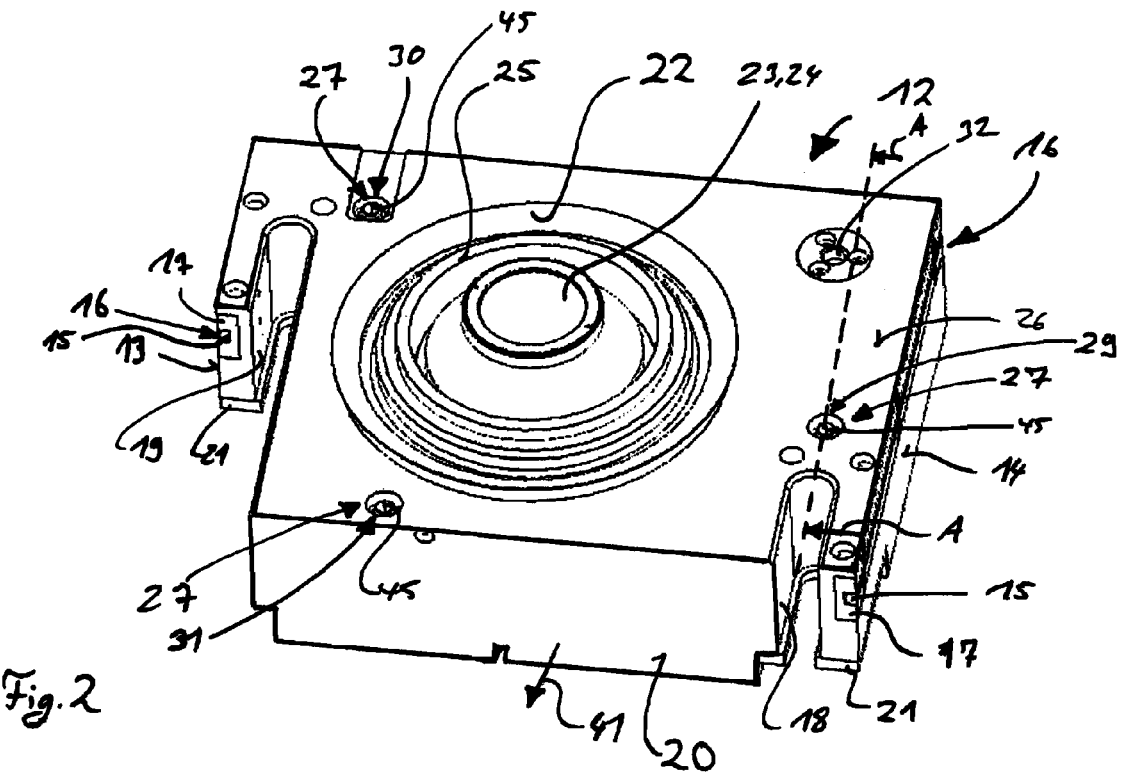

LASER MACHINE, LASER MACHINE SYSTEM

BACKGROUND OF THE INVENTION

The present invention relates to a laser machine, in particular for drilling, cutting, welding or engraving, comprising at least one laser light source for generating a laser beam and an optical system to guide and/or to manipulate the laser beam, whereby the optical system comprises at least one tool, in particular an optical lens or nozzle, which is attached to or carried by an interchangeable tool holder.

The present invention further relates to a laser machine system with a laser machine as described above.

Laser machines as described above are well known in the art. A laser light source is used to generate a laser beam which is guided and manipulated by an optic system, such that it is directed onto an object to be machined. The optic system comprises, for example among other things, such as guiding mirrors or the like, at least one tool which also guides or manipulates the laser beam and which can be interchanged in order to adapt the laser machine to a certain task, such as drilling, cutting, welding or engraving. Usually the tool, for example an optical lens, is attached to or carried by an interchangeable tool holder so that the lens or the tool itself does not have to be touched or contacted during assembly or disassembly.

With known laser machines the process of removing the tool holder from the laser machine is either complicated and time consuming or it is unsafe, such that the tool holder can fall and break.

An object of the present invention is therefore to provide a laser machine and a laser machine system which provide a possibility for a safe and easy handling, i.e. for an easy and safe assembly and disassembly of the tool or the tool holder, respectively, to the laser machine in a cost effective way.

SUMMARY OF THE INVENTION

The foregoing object is achieved by a laser machine which allows for an easy and safe handling of the tool holder and in particular an easy and safe assembling and disassembling process.

The inventive laser machine is characterized in a guiding system for the tool holder configured such that the tool holder can only be slid sideways into or out of a tool bay provided by the laser machine. As such, the tool holder has to be moved sideways for disassembling or assembling. Sideways in terms of the present invention shall be understood as horizontal. Preferably this also means that the assembling or disassembling movement is at least essentially perpendicular to the direction of the laser beam. By moving the tool holder which carries the tool sideways, it is ensured that the tool holder cannot fall off the laser machine. Additionally the guiding system of the inventive laser machine comprises an operable locking system for restraining the movement of the tool holder, in particular during use of the laser machine. The locking system thus provides a safe fastening of the tool holder in/on the laser machine during the drilling, cutting, welding or engraving process. Preferably, only when the locking system is actively operated the tool holder can be removed from the laser machine.

According to a further embodiment of the present invention, the guiding system comprises at least one guiding rail attached to the tool holder or to the tool bay and at least one guiding slot attached to the tool bay or the tool holder, respectively, for engaging with the guiding rail. The guiding system therefore comprises a straight guide, along which the tool holder is to be slid sideways into or out of the tool bay. By providing the rail and the slot an easy and essentially straight arrangement of the tool holder within the tool bay is ensured. As an alternative for providing the rail on the tool holder or the tool bay, a number of spaced apart guide elements which are arranged in a straight row can be provided. Preferably a guide rail and a guide slot are both arranged on two opposite sides of the tool holder and the tool bay, respectively.

According to a further embodiment of the present invention, the locking system comprises at least one moveable locking piston and/or at least one operable locking magnet. With the locking piston an element is provided which can be actuated by moving it from a locking position into an unlocking position and the other way around. The locking piston is preferably designed such that it is moveable in its axial extension. Instead or additionally to the locking piston, one or more operable locking magnets can be provided which interact with the tool holder or with the tool bay. Preferably, the at least one locking magnet is arranged on the tool bay such that it interacts with a magnetic element or with magnetic material of the tool holder if operated accordingly. Both, the locking piston and the locking magnet have the advantage that they can be operated rather easily and that they do not need much space for installation.

According to a preferred embodiment of the present invention, the locking piston is designed as pneumatic piston and thus actuated by compressed air such that it restrains movement of the tool holder when compressed air is supplied and that it enables movement of the tool holder if the compressed air is not supplied. Preferably the source for the compressed air is automatically activated when the laser machine is in use, such that a movement of the tool holder is restricted. Only when the laser machine is turned off, the tool holder can be removed, thereby lowering the risk of injuries or accidents. Alternatively, the locking system is designed such that the locking piston is actuated by the compressed air such that it enables movement of the tool holder when compressed air is supplied and that it restrains movement of the tool holder if the compressed air is not supplied. Herewith, an accidental unblocking of the tool holder is prohibited. According to an alternatively preferred embodiment of the present invention, the locking system is actuated by an electric or electromagnetic motor which is controlled in an according fashion.

According to a further embodiment of the present invention, the locking piston or the locking magnet—if operated—pushes or pulls the tool holder against a stopper, in particular against a support plate of the tool bay which is arranged at least essentially parallel to the sliding direction of the tool holder in the tool bay. The locking system therefore not only restrains a sideways movement of the tool holder, but also presses the tool holder against a stopper or support plate, which ultimately leads to an advantageous alignment of the tool holder with respect to the tool bay and therefore with respect to the laser machine or the laser beam itself. Preferably the locking system pushes or pulls the tool holder up against the stopper or the support plate such that by deactivating the locking piston or the locking magnet, the weight of the tool holder helps to move the tool holder away from the stopper or the support plate and therefore allows for an easy and essentially friction-free removal of the tool holder from the tool bay.

According to another embodiment of the present invention, the tool holder comprises at least one recess that opens towards a front edge of the tool holder in which the at least one locking piston engages when the tool holder is slid in into the tool bay. The front edge, i.e. at the edge which is in front when the tool holder is moved into the tool bay, comprises a receptacle formed as recess and which reaches into the tool holder in the direction of the sliding movement, such that it engages a locking piston which is arranged in the tool bay such that it reaches into the movement path of the tool holder. In this way, the locking piston becomes easily connected to the tool holder.

Preferably, the at least one locking piston comprises at least one lateral protrusion able to interact with the tool holder for the pulling or pushing movement. By engaging the above described recess of the tool holder, the locking piston forms a form closure in a direction in particular at least essentially perpendicular to the sliding direction of the tool holder, so that it can pull or push the tool holder against the stopper or support plate. It should be noted that the sideways movement of the tool holder is now already restricted by the friction closure generated through the tool holder being pushed against the support plate or the stopper.

According to a further embodiment of the present invention, the guiding system comprises an adjustment system for adjusting the alignment of the tool holder with respect to the tool bay. As described above, the locking device already provides a kind of alignment of the tool holder to the tool bay. However, it should be considered that the positioning or alignment of the tool itself within the tool holder can deviate from the alignment of the tool holder. This is of particular importance if the tool is attached to the tool holder by a flexible holding element, such as a flexible rubber bushing or the like. Therefore the additional adjustment system is advantageous, as it ensures the correct alignment of the tool in the tool bay.

According to a preferred embodiment of the present invention, the adjustment system comprises at least one adjustment unit, comprising a screw hole extending through the tool holder, in particular at least essentially perpendicular to the sliding direction of the tool holder in the tool bay, and a screw element arranged in the screw hole, the axial position of the screw element being adjustable by rotation of the screw element. Since the screw hole extends through the screw holder, the screw element may be arranged such that it projects beyond the tool holder, thereby offering a contact point in particular for the stopper or the support plate of the tool bay, therewith being able to adjust the alignment of the tool holder and by that the alignment of the tool with respect to the tool bay as a function of the position of the screw element.

Preferably, the at least one adjustment unit comprises a contact element attached to one end of the screw element and configured to interact with the stopper or support plate of the tool bay. In this case, the screw element does not directly contact the stopper/support plate of the tool bay. Instead, a contact element is provided which is preferably designed for an optimal contact with the support plate for an exact and reliable alignment of the tool holder and the tool respectively. The screw element is preferably provided with a profile for a tool tip opposite to the contact element. Since the screw holder extends through the tool holder, the screw element can be rotated by a tool, even if the tool holder is blocked in the tool bay.

According to a preferred embodiment of the present invention, the contact element is at least partially spherical in shape. This spherical shape allows a safe contact with the stopper or the support plate, even if the alignment of the tool holder deviates significantly from the tool bay. In this respect, the contact element is preferably designed as a contact ball which is attached to the end of the screw element by a form closure, a friction closure and/or by the additional use of a binder such as glue or the like.

According to a further embodiment of the present invention, the adjustment system comprises at least one of a planar surface, a circular recess and an essentially rectangular recess of the support plate, configured to interact with the contact element. By providing a planar surface the spherical shaped contact element forms a point-contact with the support plate, allowing free movement of the tool holder parallel to the support plate. The tool holder can be moved to the sides and tilted in all directions. By providing the at least essentially rectangular recess a line-contact between the contact element and the support plate is provided, allowing the tool holder to be tilted in every direction and moved only into the direction of the longitudinal extension of the rectangular recess. By providing the circular recess, the particularly spherical shaped contact element forms a circular line-contact with the recess, such that movements of the tool holder to the side are prohibited in all directions and only a tilting motion can be made for the alignment of the tool holder. The width of the rectangular recess and the diameter of the circular recess are smaller than the diameter or the width of the particularly spherical contact element to forbid sideways movement as described above.

According to a particularly preferred embodiment of the present invention the adjustment system comprises three adjustment units as described above, one to interact with the planar surface, one to interact with the circular recess and one to interact with the essentially rectangular recess. Herewith, the tool holder provides three contact elements which can be used for a total alignment of the tool holder with respect to the tool bay or laser machine, whereby due to the different counter contacts of the support plate having the planar surface, the circular recess and the rectangular recess the absolute alignment of the tool holder within the tool bay is unambiguous/distinct. Furthermore, a hyper-static or overdetermined arrangement of the tool holder in the tool bay is avoided.

According to a further embodiment of the present invention, the tool holder comprises a blowing nozzle for guiding compressed air to an object to be machined and which is automatically connectable a source for compressed air of the laser machine, in particular due to the pulling/pushing movement of the locking piston and/or magnet. As such the nozzle is preferably connected to an air channel reaching through the tool holder and opening up towards the upper surface of the tool holder pointing to the support plate. In the area of the air channel the support plate is preferably provided with a short connecting nozzle protruding from the support plate towards the tool holder. When the tool holder is pushed or pulled against the support plate by the locking piston and/or magnet, the connecting nozzle is pushed into the air channel, thereby connecting the blowing nozzle of the tool holder to an air/gas supply within the laser machine. Preferably the blowing nozzle of the tool holder is adjustable for directing the compressed air into a certain direction towards the object to be machined.

Due to the inventive adjustment system, which provides the at least one adjustment unit as part of the tool holder, it is ensured that even if the tool holder is removed from the laser machine and later assembled again, the adjustment of the tool holder with respect to the tool bay is kept. This has the advantage that the tool holder which has been initially adjusted with respect to the tool bay of said laser machine by use of the adjustment units can be used later again without the need of further adjustment of the alignment.

The inventive laser machine system is characterized in that at least one further tool holder designed as described above is provided as replacement for the above described tool holder.

It is particularly preferred to provide a set of tool holders, each tool holder carrying a different tool. Each tool holder is initially adjusted to the laser machine such that further adjustment after interchanging tool holders is unnecessary.

BRIEF DESCRIPTION OF THE DRAWINGS

In the following, the invention shall be described according to a preferred embodiment by means of the drawings, which show in FIG. 1 a laser machine with multiple laser light sources, FIG. 2 an interchangeable tool holder for a tool of the laser machine, FIG. 3 a support plate of a tool bay for the tool holder, FIG. 4 the laser machine with inserted tool holder, FIG. 5A to C three adjustment units for the alignment of the tool holder in the tool bay and FIG. 6 a further embodiment of the tool holder including a blowing nozzle.

DETAILED DESCRIPTION

Figure 1:
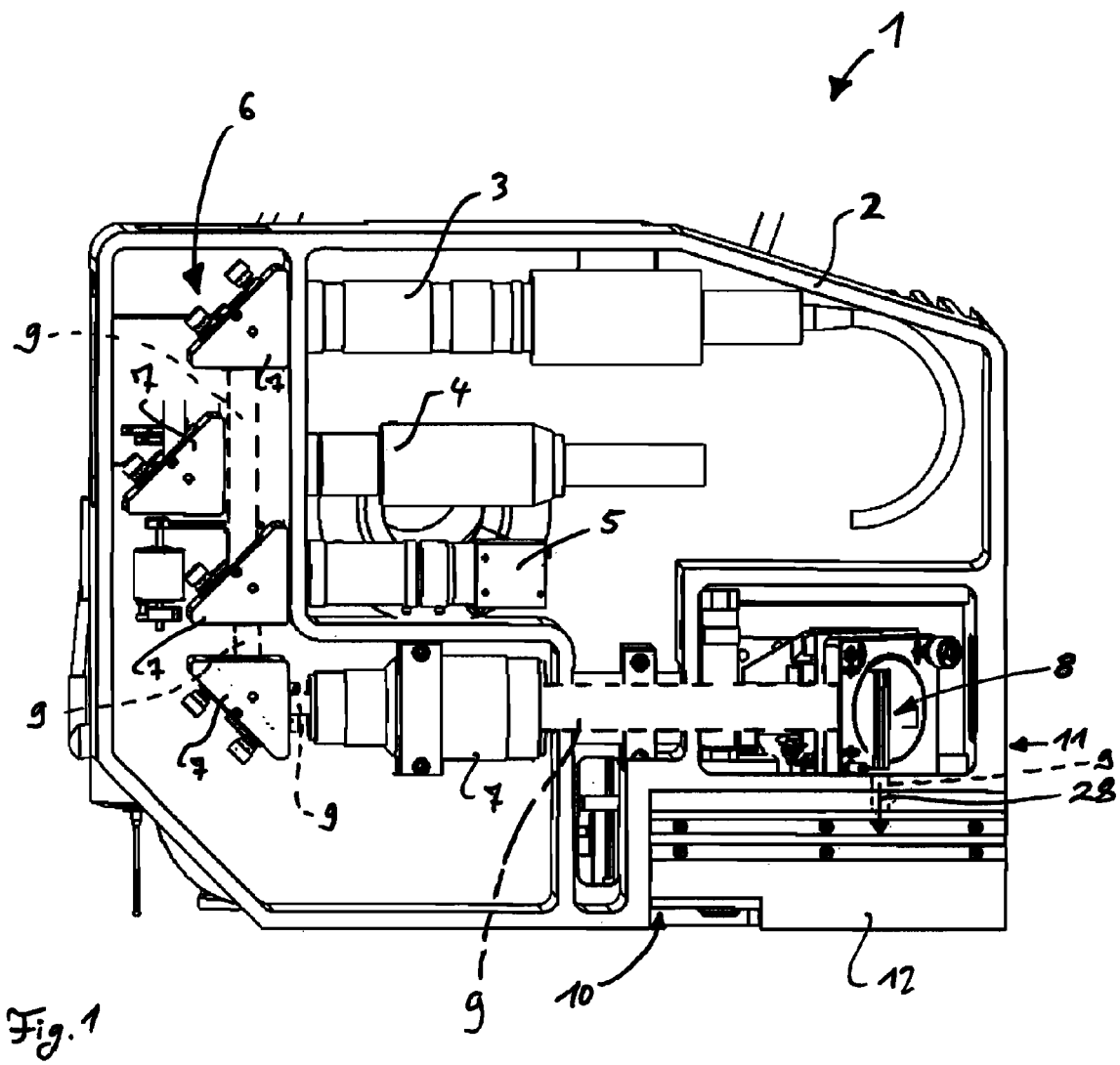

FIG. 1 shows a schematic side view of a laser machine 1 for drilling, cutting, welding or engraving an object. The laser machine 1 comprises a housing 2 in which two laser light sources 3 and 4 are arranged to generate a laser beam 9 which is used for the drilling, cutting, welding or engraving process. Optionally, a camera 5 is provided in order to enhance operation of the laser machine 1. The laser machine 1 further includes an optical system 6 arranged within the housing 2 to guide and manipulate the generated laser beam 9. The optical system 6 comprises a couple of guiding modules 7, each containing at least one guiding element such as a mirror or a lens. The optical system 6 further comprises a galvanometric laser head 8 to which the generated laser beam 9 is directed. One or more of the guiding modules 7 can be moved such that it intersects the laser beam 9 manipulated by the previous module 7 or to clear the way for the generated laser beam 9 as shown in FIG. 1.

At its lower end the laser machine 1 provides a tool bay 10 which opens to a front side 11 of the housing 2. Within the tool bay 10 an interchangeable tool holder 12 is arranged and which will be described in more detail with respect to FIG. 2 below.

FIG. 2 shows the tool holder 12 in a perspective drawing. The tool holder 12 is basically designed as a substrate having at least two opposite side surfaces 13, 14 which extend parallel to one another. In each of the side surfaces 13, 14 a guiding slot 15 of a guiding system 16 is provided. According to the present example of the laser machine 1 the respective guiding slot 15 is provided by an insert element 17 which is arranged within a slot in the respective side surface 13, 14, so that different materials for the insert element 17 and the substrate can be used. The respective guiding slot 15 extends along the length of the respective side surface 13, 14 parallel to an upper surface 26 of the tool holder 12.

The guiding system 16 further comprises two recesses 18, 19 which extend through the tool holder 12 from the upper surface 26 to the bottom and which open toward the front edge 20 of the tool holder 12. If viewed from the top, the recesses 18, 19 are U-shaped and arranged parallel but offset to one another. The recesses 18, 19 could also be described as extending into the tool holder 12 from the front edge 20 parallel to one another. The length or depth of the recesses 18 and 19 preferably equal one another.

At the bottom of the tool holder 12 a supporting plate 21 is arranged, the shape of which is essentially equal to the shape of the tool holder itself. As shown in FIG. 2 in the area of the recesses 18 and 19 the supporting plate 21 may be designed such that it reaches partially into the respective recess 18 or 19. According to another embodiment of the invention, not shown in the drawings, the supporting plate 21 is flushly aligned with the recesses 18 and 19, respectively.

Approximately in the middle of the tool holder 12 an opening 22 is provided which reaches through the tool holder 12, in particular perpendicular to the extension of the guiding slots 15. In the opening 22 a tool 23, preferably an optical lens 24 or a nozzle (not shown in the drawings) is arranged and attached to the tool holder 12. The attachment is realised by a plastic or rubber bushing which is safely secured to the tool 23 and the tool holder 12. By use of the bushing 25 the tool 23 is held within the opening 22 such that it does not extend beyond the upper surface 26.

The guiding system 16 furthermore comprises an adjustment system 27 which is used to adjust the alignment of the tool holder 12 and therewith the alignment of the tool 23 itself with respect to the tool bay 10 and the laser beam 9 which is directed by the galvanometric laser head 8 downwards or towards the tool bay 10 as indicated by the arrow 28 in FIG. 1. The adjustment system 27 further comprises three adjustment units 29, 30 and 31. The adjustment units 29 to 31 will be described in more detail further below.

The tool holder 12 is furthermore provided with an air channel 32 that reaches from the upper surface 26 to the bottom of the tool holder 12. The air channel 32 can be connected to an air supply of the laser machine 1. More details will be explained below.

FIG. 3 is a perspective view of the tool bay 10 from below, i.e. essentially contrary to the direction of arrow 28. The tool bay 10 is provided with a support plate 33 which limits the tool bay 10 upwardly. At two opposing sides the tool bay 10 is limited by guiding rails 34 of the guiding system 16. The guiding rails 34 are configured to engage the guiding slots 15 of the tool holder 12 such that the tool holder 12 can be slid onto the guiding rails 34 with the slots 15 sideways. Herewith, the tool holder 12 is to be mounted and removed to and from the tool bay 10 by a sidewards and in particular by an at least essentially horizontal, i.e. perpendicular to gravity, movement.

The guiding slots 15 and the guiding rails 34 are configured such that they allow a play between the tool holder 12 and the tool bay 10 in particular perpendicular to the direction of the sliding motion.

From the support plate 33 two locking pistons 35 and 36 of a locking system 37 protrude towards to or downwards into the tool bay 10. The locking pistons 35 and 36 are moveable in their axial direction as indicated by double arrows 38. Preferably, they are connected to a source for compressed air, such that the movement of the locking pistons 35 and 36 is actuated by compressed air. At their free ends the locking pistons 35 and 36 each comprise a lateral protrusion 39, 40 which is designed as disk having a diameter greater than the diameter of the respective piston 35, 36 itself.

The diameters of the respective piston, 35, 36 is smaller than the width of the recesses 18 and 19. If the tool holder 12 is pushed into the tool bay 10 with the help of the guiding slots 15 and the guiding rails 34 with the front edge 20 in front as indicated by an arrow 41 in FIGS. 2 and 3, the upper side 26 facing the support plate 33, the locking pistons 35 and 36 are automatically guided into the recesses 18 and 19. In the present embodiment the locking piston 35 is directed into the recess 18 and the locking piston 36 into the recess 19. For the initial mounting process, the locking pistons 35 and 36 are moved such that their respective length extending from the support plate 33 is greater than the height of the tool holder 12, such that the tool holder 12 is pushed over the lateral protrusion 39 and 40 which then face with their respective backside the underside of the tool holder 12. The locking pistons 35, 36 thereby preferably act as stopper in sliding direction. Otherwise, at least one additional sliding stopper is preferably provided in the tool bay 10. The diameter of the disks 39 and 40 is larger than the width of the recesses 18 and 19, such that the respective locking piston 35 and 36 with its disk 39 or 40 enable a form closure with the tool holder 12 in direction perpendicular to the sliding direction of the tool holder 12. By actuating the locking device 37 the locking pistons 35 and 36 are moved towards the support plate 33, such that the disks 39 and 40 pull the tool holder 12 up against the support plate 33 as shown in FIG. 4.

Figure 4:
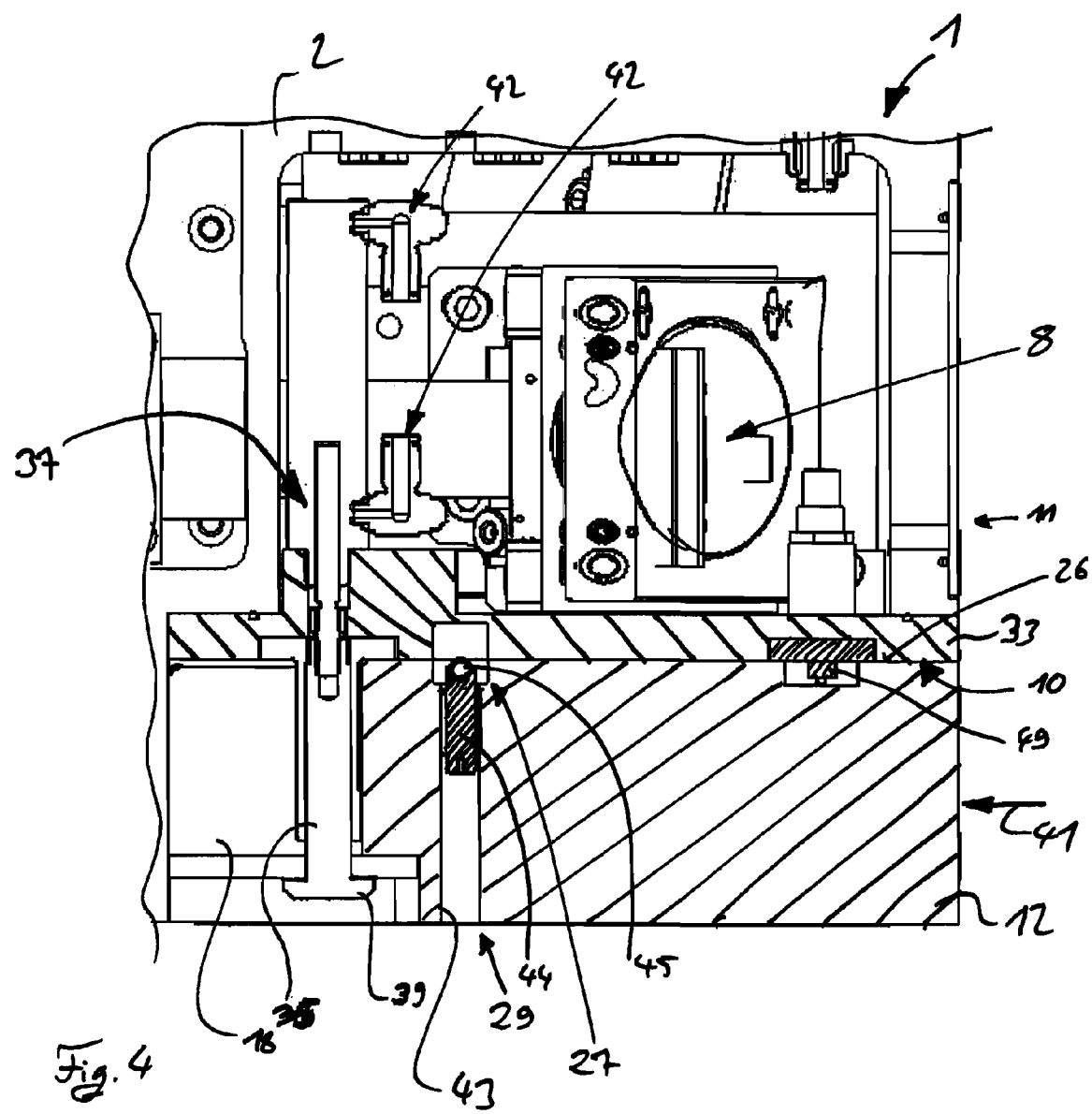

FIG. 4 is an enlarged view of the laser machine 1 at the tool bay 10. FIG. 4 shows the laser machine 1 as a sectional view along a line A-A of FIGS. 2 and 3 in the mounted state. The locking piston 35 is arranged within the recess 18 while the backside of the protrusion 39, which is formed in one piece with the locking piston 35, is in contact with the bottom of the tool holder 12, pulling it against the support plate 33.

As said before, the locking pistons 35 and 36 are each connected to a air pressure system 42, indicated in FIG. 4, comprising a pressure source. Depending on the design of the locking system 37 the locking pistons 35, 36 are either pushed downwards into the tool bay 10 and/or pulled upwards by use of compressed air. Additionally a spring may be provided for each locking piston 35, 36, urging it into one direction.

Figure 5C:
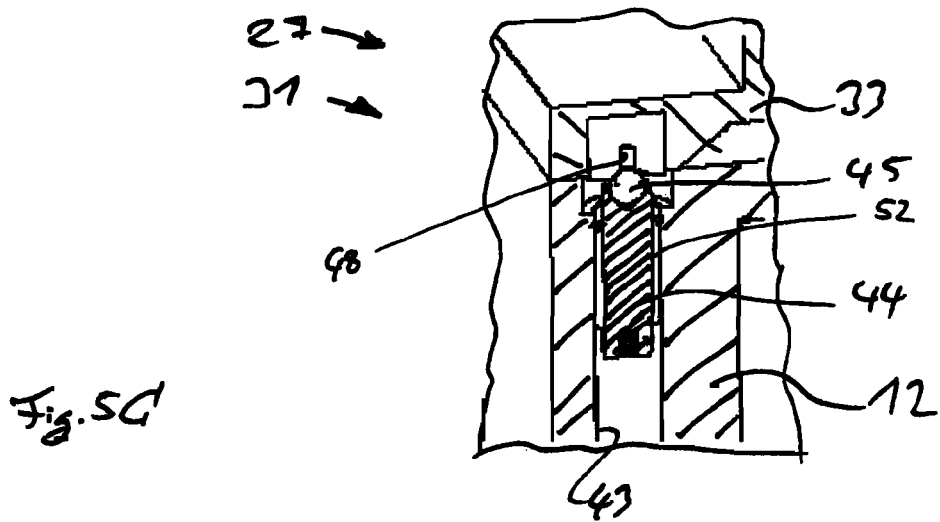
Figure 5B:
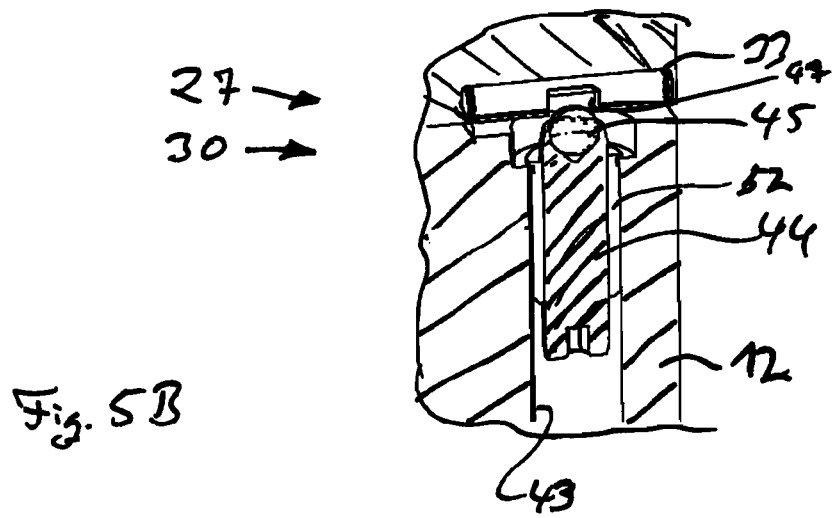
Figure 5A:
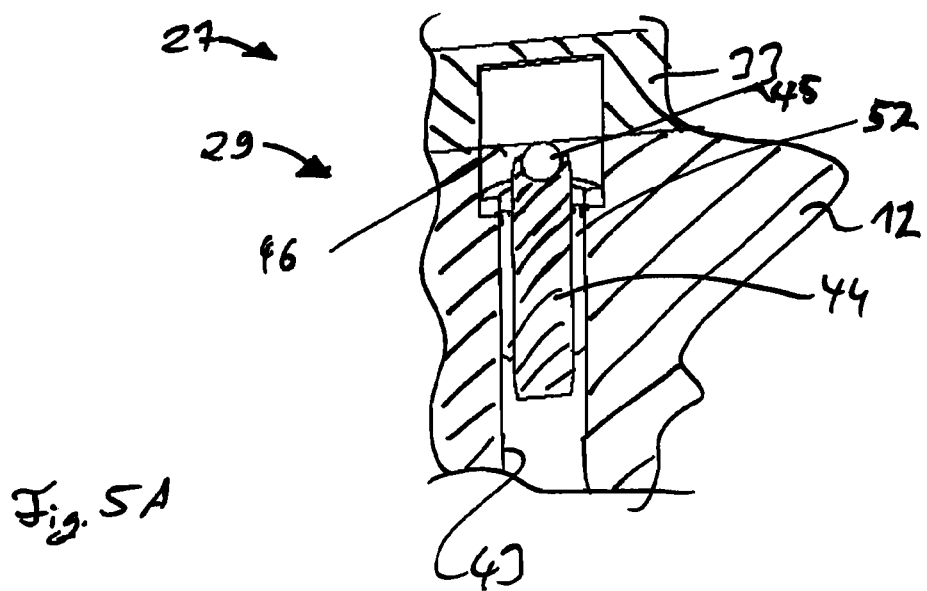

FIG. 5A to 5C show in respective sectional views the adjustment units 29 to 32 of the adjustment system 27.

Each adjustment unit 29 to 31 comprises a screw hole 43 with an inner winding which is preferably provided by an insertion sleeve 52 pushed into the screw hole. The insertion sleeve 52 preferably comprises a flange for restricting its insertion depth. In each of the screw holes 43 a screw element 44 having an outer winding interacting with the inner winding of the screw hole 43 is provided, such that by rotating the respective screw element 44 the axial position of the respective screw element 44 within the screw hole 43 is adjusted. At their ends directed towards the support plate 33, the screw elements 44 are each provided with a spherical contact element 45, presently designed as contact ball, which is safely attached to the respective screw element 44.

The adjustment units 29 to 31 differ in the design of counter contacts which interact with the respective contact element 45 when the tool holder 12 is pulled against the support plate 33 by the locking system 37.

FIG. 5A shows the adjustment unit 29 which is also shown in FIG. 4. The adjustment unit 29 provides as counter contact element at the surface of support plate 33 a planar surface 46.

The adjustment unit 30 comprises as counter contact element a essentially rectangular recess 47 within the support plate 33, as shown in FIG. 5B. The rectangular recess 47 provides a line-contact with the contact element 45 of the adjustment unit 30.

As shown in FIG. 5C the adjustment unit 31 provides as counter contact element a circular recess 48 in the support plate 33. Together with the spherical contact element 45 of the adjustment unit 31 the circular recess 48 provides a circular line contact which prevents sideways movement of the adjustment unit 31 in all directions, whereas the adjustment unit 30 is moveable along the line defined by the line-contact of the rectangular recess 47 and the adjustment unit 29 allows movement in all directions parallel to the support plate 33 as well as a tilting movement.

As shown in FIGS. 5A to 5C the counter contacts are preferably provided by insert elements inserted into respective recesses of the support plate 33, so that different materials can be chosen for the insert elements and the support plate 33. It is particularly provided that the insert elements of the counter contacts and the contact elements 45 are made of a hard material to avoid signs of deformation and wear to ensure repeatability.

Due to the three different adjustment units 29, 30 and 31 the adjustment of the tool holder 12 in relation to the tool bay 10 and therefore to the alignment of the tool 23 to the laser beam 9 can easily be adjusted. Since the adjustment system 27 is designed as part of the tool holder 12 itself, the alignment is only to be set once in the beginning, since the position of the contact elements 45 of the respective adjustment unit 29 to 31 is not changed when the tool holder 12 is removed from the tool bay.

For removing the tool holder 12 from the tool bay 10, the locking pistons 35 and 36 are released or moved downwards, thereby loosening the friction grip and the form closure between the tool holder 12 and the support plate 33 by removing the contact elements 45 from the respective counter contact elements, such that the tool holder 12 can be removed from the tool bay by sliding it out of the tool bay 10 horizontally. The locking system 27 is preferably designed such that once the supplied compressed air is cut off, the locking pistons 35 and 36 automatically release the tool holder 12. Since the tool holder is guided by the guiding slots 15 and the guiding rails 34 it cannot fall off the housing 2 by itself, but it can be removed safely by sliding it sideways. It is of course possible to alternatively provide an electric system for actuating the locking pistons 35 and 35 instead of a pneumatic system as described above. The tool holder 12 can be unlocked remotely while ensuring the retention of the tool 23. This allows to change it later, manually, without running the risk of dropping it when unlocking.

According to another embodiment, the tool holder 12 can only be unlocked and removed if compressed air is supplied to the locking system 27, thereby ensuring that the tool holder 12 is retained in case of a pneumatic cut. Preferably each locking piston 35, 36 is provided with a spring which presses the respective locking piston 35, 36 into the locking position, i.e. into direction of the support plate 33, such that if the locking system 27 is not actuated actively, the tool holder 12 is safely retained within the tool bay 10.

It is also possible to additionally provide an extra manual aid to move the locking pistons 35, 36 into their unlocking position.

Once the tool holder 12 is removed from the tool bay 10 a tool holder designed the same way as the tool holder 12 but carrying a different tool can be slid into the tool bay 10. The laser machine 1 and the two or more tool holders carrying different tools form a laser machine system which allows easy interchange/replacement of the respective tool holder. Due to the locking system 27 each tool holder 12 has to be adjusted only once during its first use.

Figure 6:
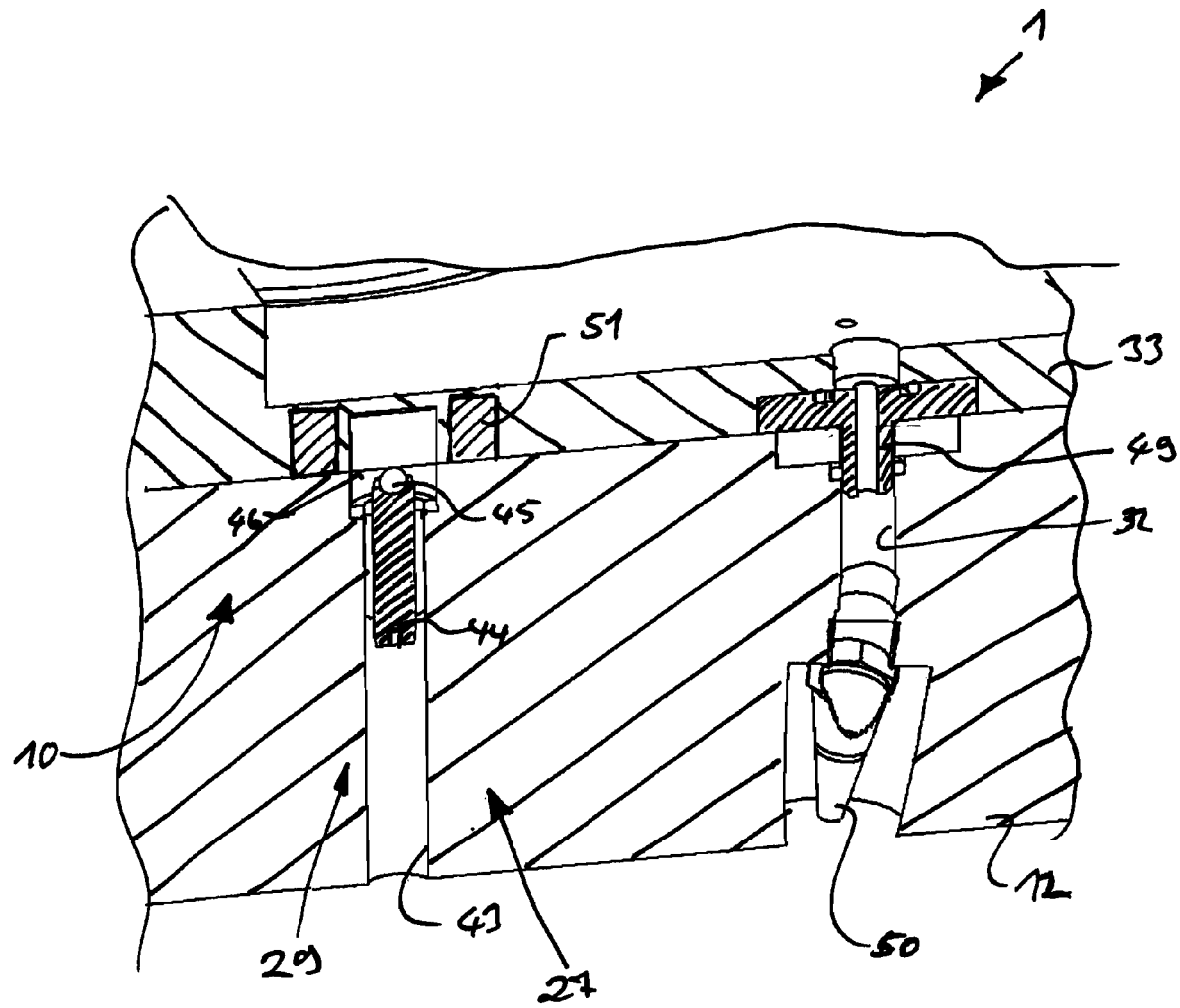

As shown in FIG. 3, the support plate 33 is furthermore provided with a connecting nozzle 49 which is pushed into the air channel 32 of the tool holder 12, as indicated in FIG. 6, such that the air channel 32 is connected to the pressure system of the laser machine 1 due to the movement of the tool holder 12 towards the support plate 33 when the locking system 27 is actuated to block movement of the tool holder 12.

As shown in FIG. 6 which is an enlarged view of FIG. 4 including the air channel 32, the opposite end of the air channel 32 is provided with a nozzle 50 which is adjustable, such that the compressed air is directed towards a wanted direction, in particular towards the object to be machined.

As can be seen from FIG. 6, the free end of the screw element 44 opposite to the contact element 45 is provided with a profile for a tool tip such that the screw element 44 can be rotated even if the tool holder 12 is in the locked state in the tool bay 10.

Furthermore, FIG. 6 shows an alternative embodiment of the locking system 37 which instead of the locking pistons 35, 36 provides at least one locking magnet 51. In the embodiment according to FIG. 6 the locking magnet 51 is assigned to the adjustment unit 29. The locking magnet 51 is designed as operable electromagnet which upon activation pulls the tool holder 12 against the support plate 33. The locking magnet 51 is arranged within the support plate 33 and electrically connected to a control unit of the laser machine 1. According to the exemplary embodiment of FIG. 6 the locking magnet 51 is designed as ring magnet which is preferably arranged coaxial to the rotating axis of the screw element 44. Of course, the locking magnet 51 can also be designed in a different shape. According to the present embodiment, to each adjustment unit 29, 30 and 31 an accordingly designed and arranged locking magnet 51 is assigned. According to another embodiment (not shown) one or more locking magnets can also be arranged spaced apart from the respective adjustment units 29, 30, 31 particularly within the plane of the support plate 33. According to the embodiment of FIG. 6 the locking pistons 35, 36 are no longer necessary and are preferably omitted. For a pre-alignment of the tool holder 12 with respect to the tool bay 10, the tool bay 10 is provided with one or more sliding stoppers which limit the sliding movement of the tool holder 12 into the tool bay 10 such that the adjustment units 29 to 31 are at least essentially aligned with the respective counter contacts.

A laser machine 1 of the above mentioned laser machine system is preferably provided with a tool rack that contains a number of different tools ready to be interchanged with the tool holder 12. Preferably an automatic changer is provided which removes the tool holder 12 from the tool bay 10, puts it in an empty tray of the rack, takes a different tool out of another tray of the tool rack and slides it into the tool bay 10 where it is locked by the locking system 27.

The invention claimed is:

1. A laser machine comprising at least one laser light source for generating a laser beam, an optical system to guide and/or manipulate the laser beam, the optical system comprises at least one tool, attached to an interchangeable tool holder, a guiding system for the tool holder is configured such that the tool holder can only be slid sideways into or out of a tool bay provided by the laser machine, the guiding system comprising an operable locking system for restraining the movement of the tool holder in the tool bay.

2. A laser machine according to claim 1, wherein the at least one tool is an optical lens.

3. A laser machine according to claim 1, wherein the at least one tool is a nozzle.

4. A laser machine according to claim 1, wherein the guiding system comprises at least one guiding rail attached to one of the tool holder and the tool bay and at least one guiding slot to engage with the guiding rail attached to the other of the tool bay and the tool holder.

5. A laser machine according to claim 1, wherein the locking system comprises at least one moveable locking piston and/or at least one operable locking magnet.

6. A laser machine according to claim 5, wherein the locking piston is actuated by compressed air, wherein movement of the tool holder is enabled when compressed air is supplied and movement is restrained when compressed air is not supplied.

7. A laser machine according to claim 5, wherein the at least one locking piston or locking magnet is operable to push or pull the tool holder against a support plate of the tool bay which is arranged at least essentially parallel to a sliding direction of the tool holder in the tool bay.

8. A laser machine according to claim 5, wherein the tool holder comprises at least one recess that opens towards a front edge of the tool holder wherein the at least one locking piston engages the recess when the tool holder is slid into the tool bay.

9. A laser machine according to claim 5, wherein the at least one locking piston comprises at least one lateral protrusion able to interact with the tool holder.

10. A laser machine according to claim 1, wherein the guiding system comprises an adjustment system for adjusting alignment of the tool holder with respect to the tool bay.

11. A laser machine according to claim 10, wherein the adjustment system comprises at least one adjustment unit comprising (a) a screw hole extending through the tool holder, in essentially a perpendicular direction to the sliding direction of the tool holder in the tool bay, and (b) a screw element within the screw hole, wherein an axial position of the screw element is adjustable by rotation of the screw element.

12. A laser machine according to claim 11, wherein the at least one adjustment unit comprises a contact element attached to an end of the respective screw element, the contact element is configured to interact with a stopper of the tool bay.

13. A laser machine according to claim 12, wherein the contact element is at least partially spherical in shape.

14. A laser machine according to claim 13, wherein the adjustment system comprises at least one of a planar surface, a circular recess and an essentially rectangular recess at the stopper to interact with the respective contact element.

15. A laser machine according to claim 13, wherein the adjustment system comprises three adjustment units, one to interact with the planar surface, one to interact with the circular recess and one to interact with the essentially rectangular recess.

16. A laser machine according to claim 1, wherein the tool holder comprises a blowing nozzle for guiding compressed air to an object to be machined, wherein the nozzle is connected to a source for compressed air of the laser machine.

* * * * *